US007607876B2

(12) United States Patent
Hall et al.

(10) Patent No.: US 7,607,876 B2
(45) Date of Patent: Oct. 27, 2009

(54) LOCKING MECHANISM FOR A HIGH-PRESSURE, HIGH-TEMPERATURE PRESS

(76) Inventors: David R. Hall, 2185 S. Larsen Pkwy., Provo, UT (US) 84606; Timothy C. Duke, 2185 S. Larsen Pkwy., Provo, UT (US) 84606

( * ) Notice: Subject to any disclaimer, the term of this patent is extended or adjusted under 35 U.S.C. 154(b) by 755 days.

(21) Appl. No.: 11/308,187

(22) Filed: Mar. 10, 2006

(65) Prior Publication Data

US 2007/0209186 A1 Sep. 13, 2007

(51) Int. Cl.
*F16B 39/02* (2006.01)

(52) U.S. Cl. ...................... 411/110; 411/120; 411/393; 411/948

(58) Field of Classification Search ................. 411/110, 411/321, 948, 119, 120, 103, 393
See application file for complete search history.

(56) References Cited

U.S. PATENT DOCUMENTS

| | | | | | |
|---|---|---|---|---|---|
| 442,489 | A * | 12/1890 | Miller | ........................ | 248/332 |
| 572,460 | A * | 12/1896 | Van Derveer | ............... | 411/120 |
| 589,545 | A * | 9/1897 | Comra | ....................... | 411/322 |
| 679,935 | A * | 8/1901 | Behler | ........................ | 411/321 |
| 887,382 | A * | 5/1908 | Diplock | ...................... | 411/120 |
| 902,727 | A * | 11/1908 | Guenther | ................... | 184/48.1 |
| 1,031,353 | A * | 7/1912 | Luquire | ...................... | 411/198 |
| 1,267,877 | A * | 5/1918 | Krussand | .................... | 301/122 |
| 1,687,806 | A * | 10/1928 | Strong | ........................ | 384/480 |
| 2,024,901 | A * | 12/1935 | Wrigley | ....................... | 285/14 |
| 2,918,699 | A | 12/1959 | Hall | | |
| 3,093,862 | A | 6/1963 | Gerard | | |
| 3,257,688 | A | 6/1966 | Levey | | |
| 4,613,265 | A * | 9/1986 | Visinand | ..................... | 411/120 |
| 5,954,466 | A * | 9/1999 | Coffey et al. | ............... | 411/119 |
| 6,336,802 | B1 | 1/2002 | Hall | | |
| 6,464,440 | B1 * | 10/2002 | Steele | ........................ | 411/378 |

* cited by examiner

*Primary Examiner*—Flemming Saether
(74) *Attorney, Agent, or Firm*—Daniel P. Nelson; Tyson J. Wilde

(57) ABSTRACT

A locking mechanism to prevent rotation between a press frame and a hydraulic cartridge threaded into the press frame is disclosed in one aspect of the invention as including a locking mechanism body; one or more fasteners to attach the body to the frame of an HPHT press; and a pin extendable with respect to the body and adapted to engage an aperture in the hydraulic cartridge. The pin prevents rotation of the hydraulic cartridge relative to the frame. In certain embodiments, a cap constructed of a softer material than the hydraulic cartridge is attached to the end of the pin to prevent scratching or damage to the hydraulic cartridge.

6 Claims, 9 Drawing Sheets

LOCKING MECHANISM FOR A HIGH-PRESSURE, HIGH-TEMPERATURE PRESS

BACKGROUND OF THE INVENTION

1. Field of the Invention

The present invention relates to high-pressure, high-temperature presses, and more particularly to locking mechanisms for high-pressure, high-temperature presses.

2. Background

Over the course of the last fifty years, ultra high-pressure, high-temperature (HPHT) presses have been developed to produce superhard materials. Superhard materials may include, for example, diamond, polycrystalline diamond, ceramics, cubic boron nitride, or exotic metalloid gases such as metallic hydrogen. To create these materials, these presses must often exert payload pressures in excess of 35 kilobars while applying temperatures of 1000 degrees Celsius or more.

One of the original designs for an HPHT press was invented by Dr. H. Tracy Hall in the 1950s and is disclosed in U.S. Pat. No. 2,918,699, which is herein incorporated by reference for all that it contains. This design utilizes a tie-bar frame supporting several hydraulic piston cylinders to exert pressure on a centrally located payload. Because the bending moments of the tie-bar press are so great, the tie-bar press becomes enormous as the size of the press is increased. For example, the weight of a 3000-ton tie bar press may exceed sixty tons due to the force exerted by the hydraulic cylinders. By comparison, the weight of a 4000-ton tie-bar press may increase to over one hundred tons. Nevertheless, despite this enormous size, the bending moments of a 4000-ton tie-bar press are great enough that the tie-bar frame still experiences occasional fatigue failures.

More recently, an HPHT press was invented by David R. Hall which utilizes a reduced-mass unitary frame, which is disclosed in U.S. Pat. No. 6,336,802, which is herein incorporated by reference for all that it contains. The unitary frame is constructed of a high strength material, such as high-strength steel, and comprises intersecting cylindrical openings where several hydraulic cartridges are inserted and attached, such as by screwing the hydraulic cartridges into the openings. These hydraulic cartridges may be used to exert huge forces on a payload located at or near the center of the unitary frame. Due to its unique design, a 3000-ton press using the unitary frame may, in certain embodiments, weigh less than 12 tons. This provides a significantly better weight-to-capacity ratio compared to the tie-bar press described above.

More recently, an improvement to the unitary frame design was disclosed in U.S. patent application Ser. No. 11/175,238 directed to “Strain Matched Threads for a High Pressure High Temperature Press Apparatus”, also invented by David R. Hall et al. That application discloses the use of tapered threads to mate the hydraulic cartridges to the openings of the unitary frame. It is believed that the by choosing a proper angle for the tapered threads, the reaction forces of the press are distributed substantially equally across the threads. The tapered-thread design may also reduce fatigue or cracking of the hydraulic cylinders by roughly equalizing, or at least reducing the great disparity between, the stiffness of the hydraulic cylinders and the unitary frame. U.S. patent application Ser. No. 11/175,238 is also herein incorporated by reference for all that it contains.

Moreover, because of the taper angle, number of threads, and coarseness of the thread form, the hydraulic cartridges may only require about three complete turns for all the threads to fully engage. The tapered threaded connection is thus a more efficient design that makes assembly and repair of the press apparatus significantly quicker than the non-tapered unitary frame design, which required as many as fifteen complete rotations for the threads to seat. Consequently, the tapered-thread design may be about five times quicker to assemble than previous non-tapered designs. Additionally, thread damage due to accidental cross-threading during make up of the hydraulic cartridge and unitary frame is substantially reduced using tapered threads. Finally, tapered threads increase the thread surface area, thereby providing excellent pull-out resistance.

Nevertheless, tapered threads may also be prone to unscrew upon applying pull-out pressure. This is potentially dangerous in an HPHT press and may cause thread damage to the hydraulic cylinder or the unitary frame. Thus, apparatus and methods are needed to prevent a tapered threaded connection from unscrewing. Further needed are apparatus and methods for finely adjusting the threaded connection to ensure that the tapered threads seat properly.

SUMMARY OF THE INVENTION

Consistent with the foregoing, and in accordance with the invention as embodied and broadly described herein, a locking mechanism to prevent rotation between a press frame and a hydraulic cartridge threaded into the press frame is disclosed in one aspect of the invention as including a locking mechanism body; one or more fasteners to attach the body to the frame of an HPHT press; and a pin extendable with respect to the body and adapted to engage an aperture in the hydraulic cartridge. The pin prevents rotation of the hydraulic cartridge relative to the frame. In certain embodiments, a cap constructed of a softer material than the hydraulic cartridge is attached to the end of the pin to prevent scratching or damage to the hydraulic cartridge.

In certain embodiments, the body comprises an aperture to accommodate the pin. The locking mechanism may further include a registration member residing in the aperture and retaining the pin. The registration member may be internally threaded to engage external threads on the pin. Thus, the pin may be extended with respect to the body by rotating the pin relative to the registration member.

In certain embodiments, the aperture in the locking mechanism body may be sized to allow linear movement of the registration member and the pin in a lateral direction with respect to the body. Because the tapered threaded connection is circular, the aperture may be formed such that the linear movement follows a substantially circular path. In certain embodiments, an adjustment mechanism may be used to adjust the registration member along the circular path. This allows a user to finely rotate the hydraulic cartridge with respect to the frame to ensure that the tapered threads seat properly.

In another aspect of the invention, an ultra high-pressure, high-temperature press includes a frame, a hydraulic cartridge threaded into the frame, and a locking mechanism that, when engaged, prevents rotation of the hydraulic cartridge relative to the frame. In certain embodiments, the locking mechanism may include a body, one or more fasteners to attach the body to the frame, and a pin that extends with respect to the body to engage an aperture in the hydraulic cartridge. The pin prevents rotation of the hydraulic cartridge relative to the frame.

In yet another aspect of the invention, a method for preventing rotation between a frame and a hydraulic cartridge threaded into the frame includes providing a frame, threading a hydraulic cartridge into the frame, and engaging a locking mechanism to prevent rotation of the hydraulic cartridge relative to the frame.

The present invention provides novel apparatus and methods for preventing rotation between a frame and a hydraulic cartridge threaded into the frame. The features and advantages of the present invention will become more fully apparent from the following description and appended claims, or may be learned by practice of the invention as set forth hereinafter.

BRIEF DESCRIPTION OF THE DRAWINGS

In order to describe the manner in which the above-recited features and advantages of the present invention are obtained, a more particular description of apparatus and methods in accordance with the invention will be rendered by reference to specific embodiments thereof, which are illustrated in the appended drawings. Understanding that these drawings depict only typical embodiments of the present invention and are not, therefore, to be considered as limiting the scope of the invention, apparatus and methods in accordance with the present invention will be described and explained with additional specificity and detail through the use of the accompanying drawings in which.

DETAILED DESCRIPTION OF THE INVENTION

Reference throughout this specification to “one embodiment,” “an embodiment,” or similar language means that a particular feature, structure, or characteristic described in connection with the embodiment is included in at least one embodiment in accordance with the present invention. Thus, use of the phrases “in one embodiment,” “in an embodiment,” and similar language throughout this specification may, but does not necessarily, all refer to the same embodiment.

Furthermore, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

In the following description, numerous specific details are disclosed to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
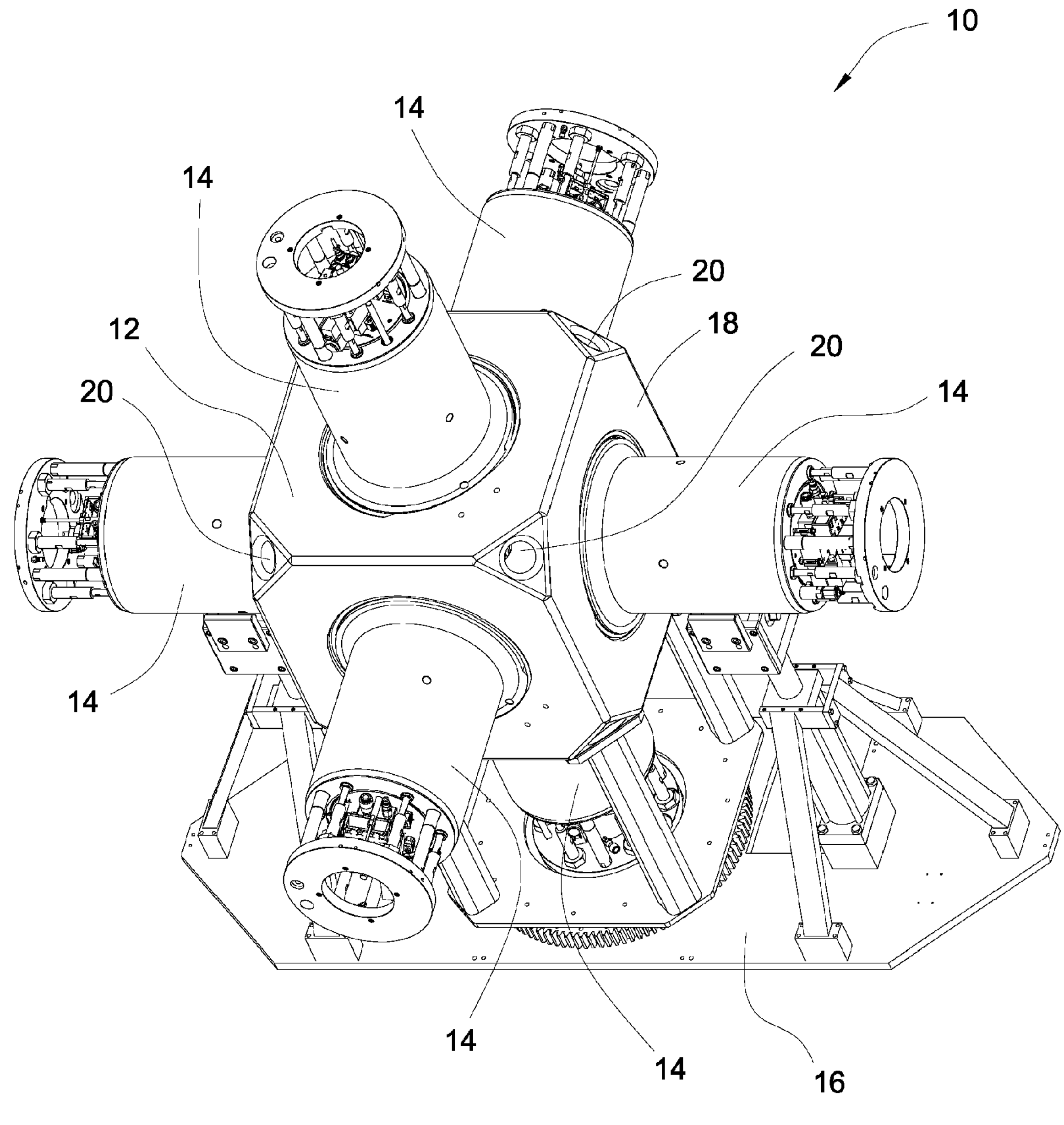
FIG. 1 is a perspective diagram of one embodiment of an HPHT press apparatus for use with a locking mechanism in accordance with the present invention.

Referring to FIG. 1, in selected embodiments, an HPHT press 10 may include a frame 12 and several hydraulic cartridges 14 mounted to the frame 12. The HPHT press 10 may rest on a support base 16 to facilitate repair and assembly of the press 10. The frame 12 may include one or more access holes 20 extending from an outer surface 18 to an inner reaction chamber. The access holes 20 may provide access to the reaction chamber when the hydraulic cartridges 14 are installed in the frame 12 and may be used to insert or remove a payload from the reaction chamber.

The frame 12 may be constructed of a high strength material, such as high-strength steel, and include several intersecting cylindrical openings where the hydraulic cartridges 14 are inserted and mounted. In this embodiment, the hydraulic cartridges 14 are mounted to the frame 12 by screwing the cartridges 14 into the openings. These hydraulic cartridges 14 may be used to exert enormous pressures on a payload located in the reaction chamber at or near the center of the frame 12.

Figure 2:
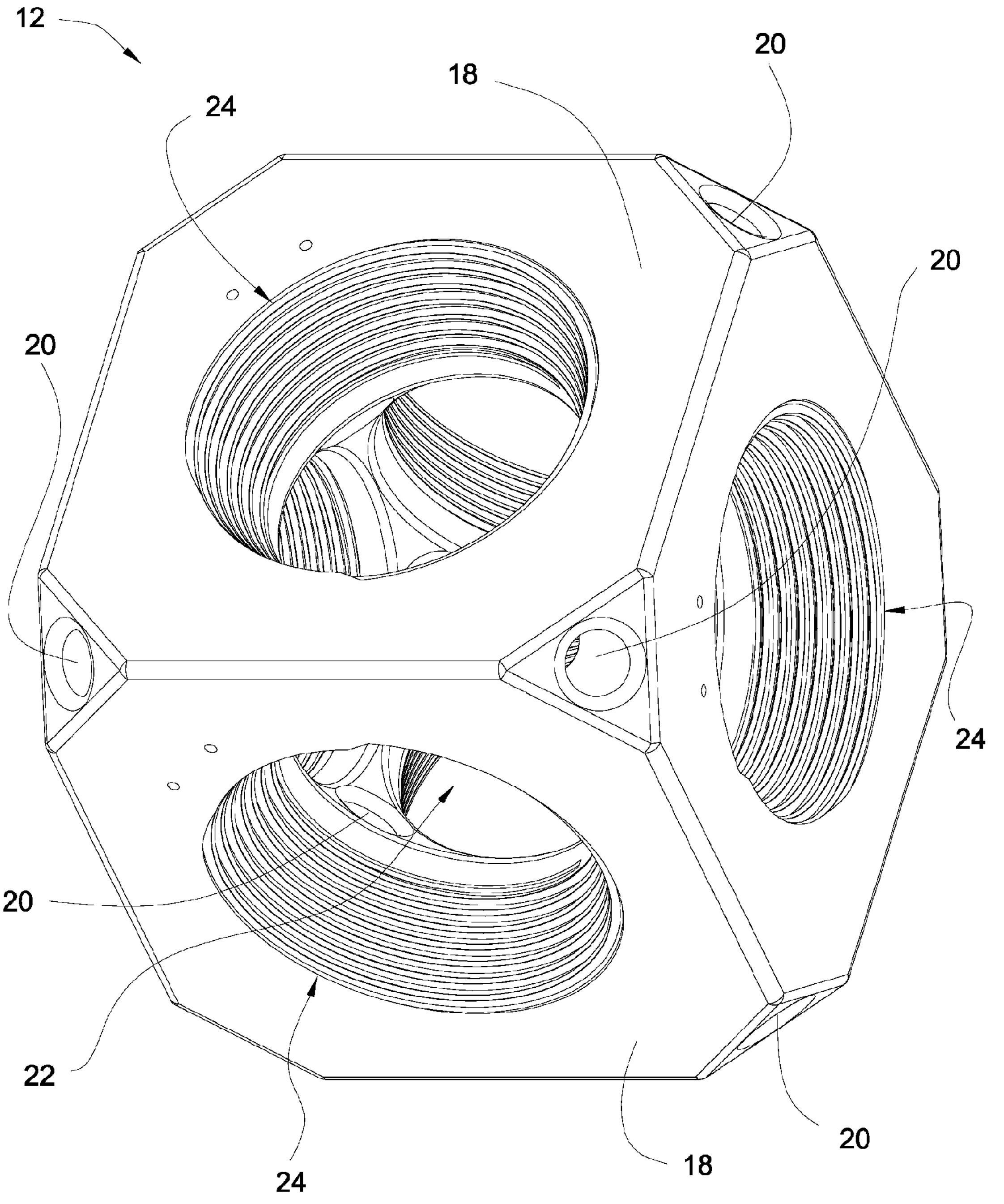
FIG. 2 is a perspective view of one embodiment of a unitary frame having tapered threads for use in an HPHT press.

Referring to FIG. 2, as mentioned, a frame 12 may form an inner reaction chamber 22 to accommodate a centrally located payload. In the illustrated embodiment, the frame 12 is a unitary structure. Nevertheless, it is contemplated that the locking mechanism illustrated in FIGS. 5 through 9 may be used with other frame structures, such as those formed or assembled from several components. A frame 12 may include several internally threaded openings 24 extending from the outer surface 18 to the inner reaction chamber 22. As will be illustrated in FIG. 3, the hydraulic cartridges 14 may be provided with corresponding external threads to allow the cartridges 14 to be screwed into the threaded openings 24. In certain embodiments, the frame 12 may have a substantially cubic shape. In other embodiments, a frame 12 may have a rectangular, spherical, or polyhedron shape.

Figure 3:
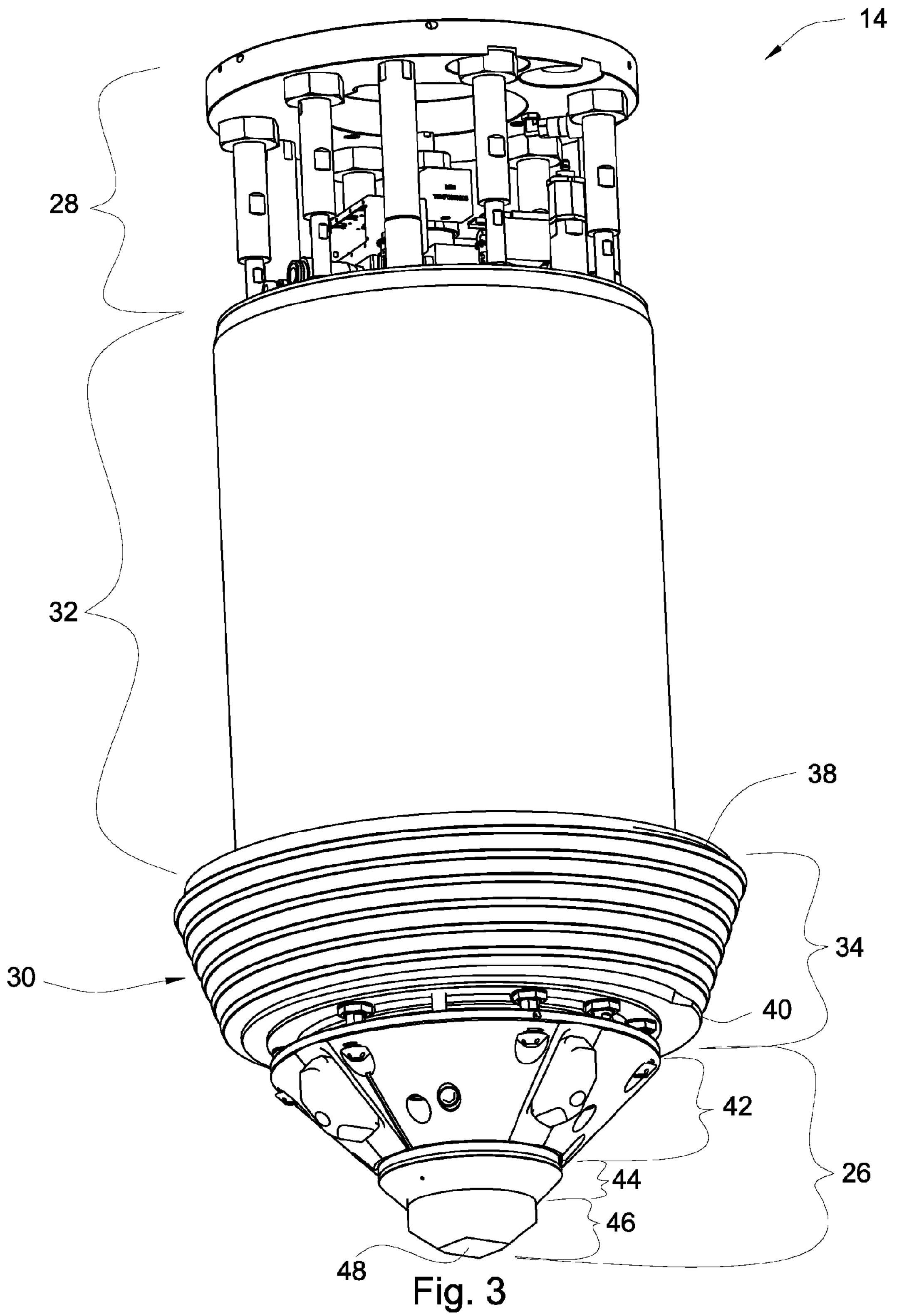
FIG. 3 is a perspective view of one embodiment of a hydraulic cartridge having tapered threads connectable to the unitary frame illustrated in FIG. 2.

Referring to FIG. 3, in selected embodiments, a hydraulic cartridge 14 may include a working end 26 and a hydraulic end 28. The working end 26 may be used to exert pressure on a payload. The hydraulic end 28 may be used to regulate the flow of hydraulic fluid into and out of the hydraulic cartridge 14 to extend and retract an anvil on the working end 26. The hydraulic cartridge 14 may include a hydraulic cylinder 32 comprising a truncated conical section 30. The truncated conical section 30 may be provided with tapered external threads 34 that extend radially inward from a first cartridge thread 38, adjacent to the hydraulic cylinder 32, to a last cartridge thread 40, adjacent to the working end 26. In certain embodiments, the working end 26 may include three primary components: a key ring 42, a binding ring 44, and an anvil 46. A face 48 of the anvil 46 may be used to exert force on a reaction cell during a press cycle while the contents of the reaction cell are heated to a level sufficient for sintering and producing superhard materials.

Figure 4:
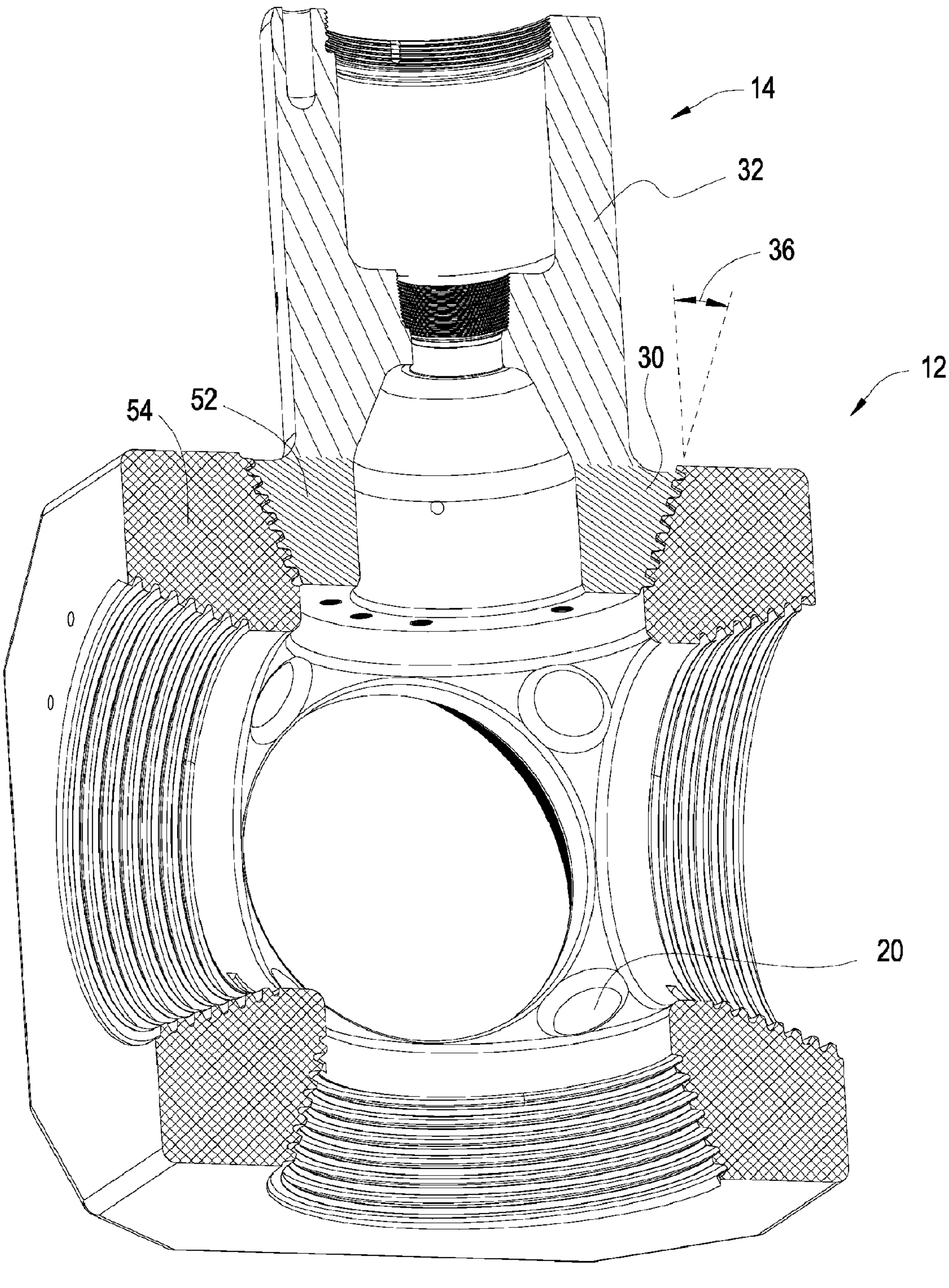
FIG. 4 is a cross-sectional perspective view of a unitary frame and hydraulic cartridge connected together.

FIG. 4 is a cross-sectional view of a hydraulic cartridge 14 installed in a frame 12. The hydraulic cartridge 14 is shown without the working end 26, hydraulic end 28, and other internal components to more easily and clearly describe the invention. A change in cross hatch signifies the transition from the cylindrical portion of the hydraulic cylinder 32 to the truncated conical section 30. As illustrated, external tapered threads on the truncated conical section 30 may screw into the internal tapered threads of the frame 12.

By choosing a proper angle 36 for the tapered threads and a proper ratio between the cross-sectional area 52 of the truncated conical section 30 and the cross sectional area 54 of the frame 52, the reaction forces of the press 10 may be more evenly distributed across the threads. This design may also reduce fatigue or cracking of the hydraulic cylinders 32 by reducing the imbalance between the stiffness of the hydraulic cylinders 32 and the unitary frame 12. Furthermore, due to the angle of the taper, number of threads, and coarseness of the threaded form, the hydraulic cartridges 14 may only require about three complete turns for all the threads to fully engage. This may provide a more efficient design that makes assembly and repair of the press apparatus 10 significantly quicker than a non-tapered design.

For a more detailed discussion of the press 10 and the advantages of the tapered thread design, the reader is referred to U.S. patent application Ser. No. 11/175,238 directed to "Strain Matched Threads for a High Pressure High Temperature Press Apparatus," invented by Hall et al., which is herein incorporated by reference in its entirety.

Figure 5:
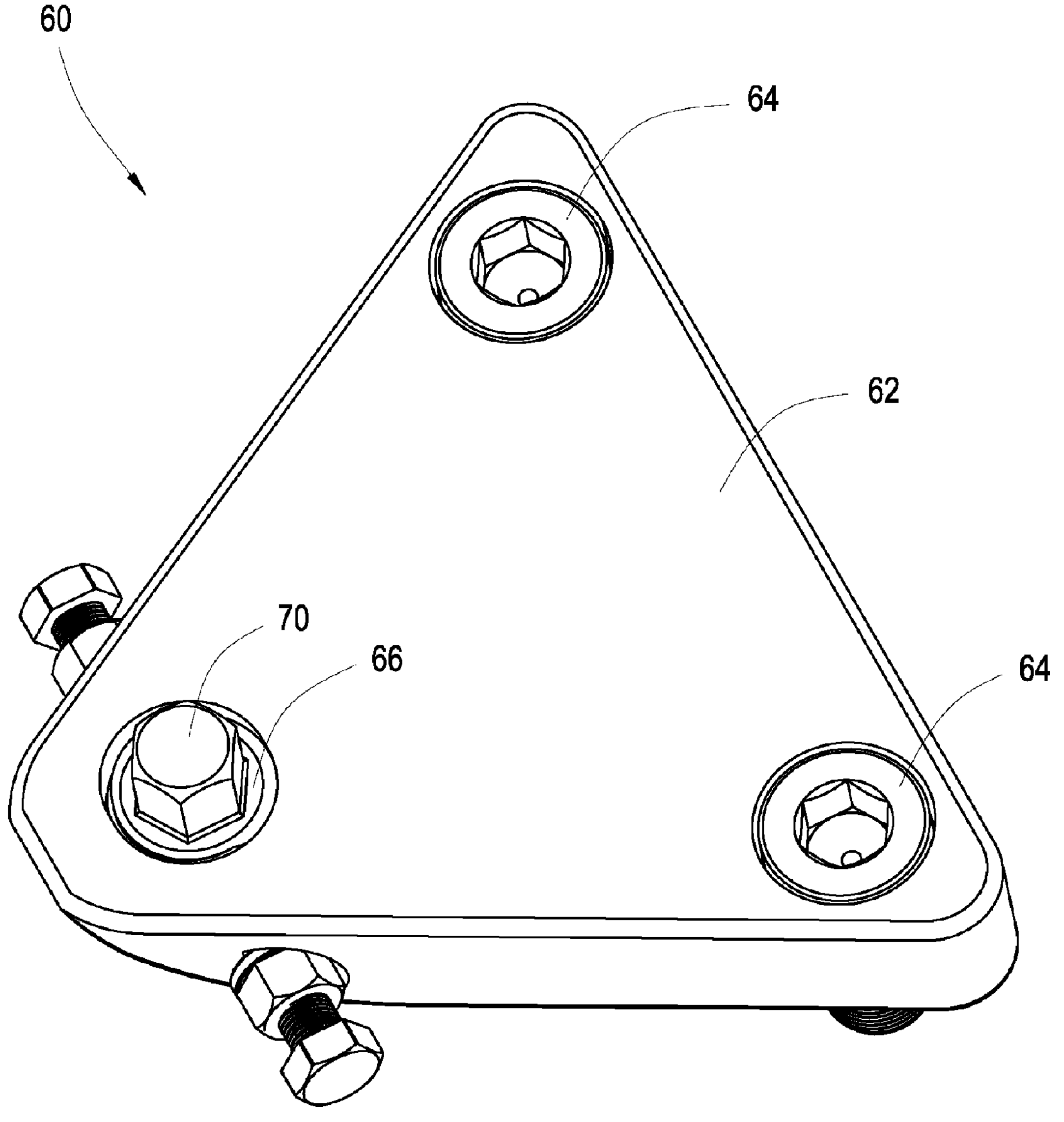
FIG. 5 is a perspective top view of a locking mechanism in accordance with the invention.
Figure 6:
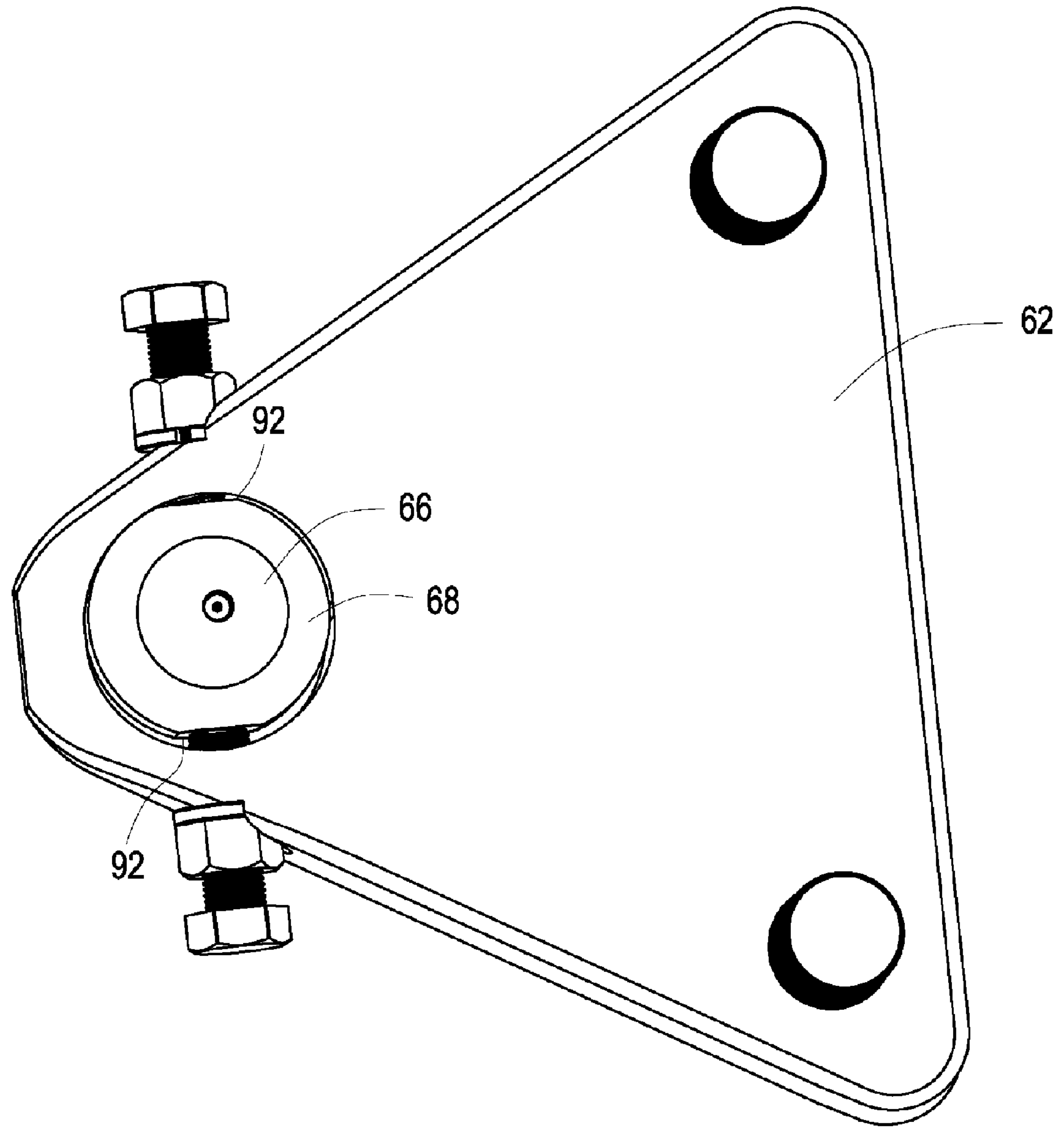
FIG. 6 is a perspective bottom view of a locking mechanism in accordance with the invention.
Figure 7:
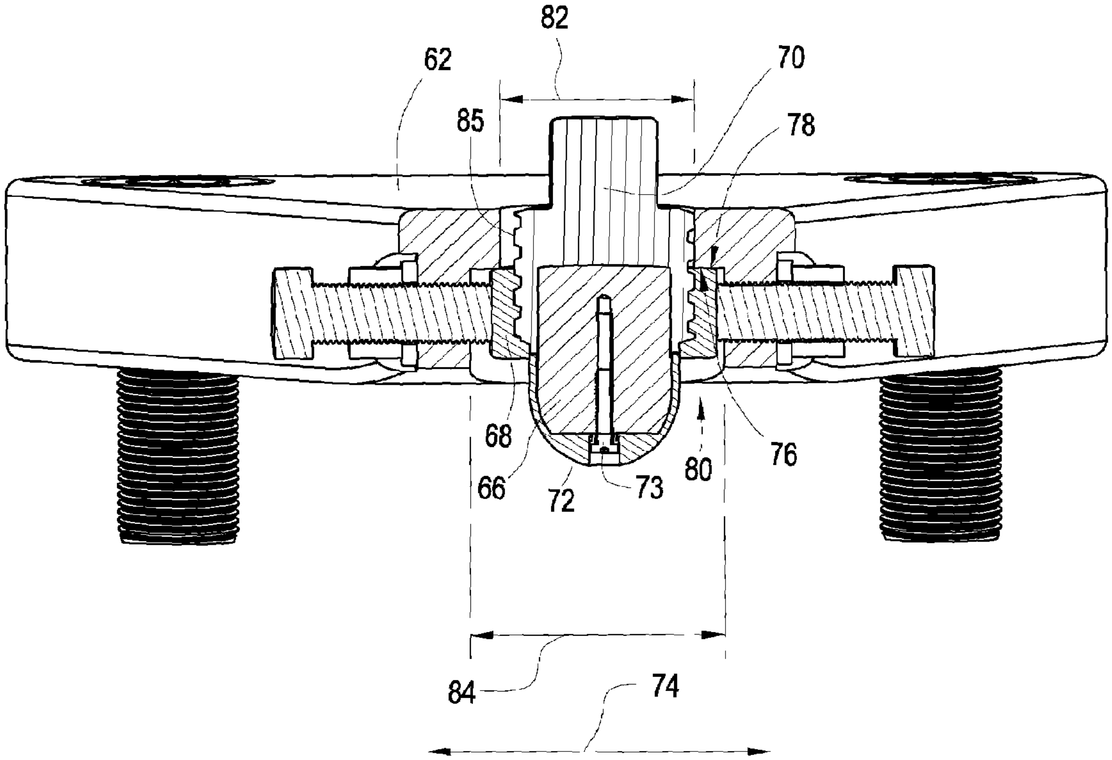
FIG. 7 is a cross-sectional front view of a locking mechanism in accordance with the invention.

Referring to FIGS. 5 through 7, despite the significant advantages previously mentioned, tapered threads may be prone to unscrew upon applying pull-out pressure. This is potentially dangerous in an HPHT press 10 due to the enormous forces exerted by the hydraulic cartridges 14. Moreover, unscrewing of the tapered threads may impair the seat between the external threads of the hydraulic cartridge 14 and the internal threads of the frame 12, potentially damaging the threads of the hydraulic cartridge 14 or the unitary frame 12. Thus, apparatus and methods are needed to prevent a tapered threaded connection from unscrewing.

In selected embodiments, a locking mechanism 60 in accordance with the invention may be used to prevent rotation between the tapered threads of the hydraulic cartridge 14 and the frame 12. In one embodiment, a locking mechanism 60 may include a body 62 and one or more fasteners 64, such as bolts, screws, pins, studs, or the like to attach the body 62 to the frame 12. Ideally, the fasteners 64 allow the locking mechanism 60 to be removed from the frame 12 to allow the hydraulic cartridges 14 to be screwed into or unscrewed from frame 12. Once the hydraulic cartridges 14 are screwed into the frame 12, the locking mechanisms 60 may be attached to the frame 12 using the fasteners 64. A locking mechanism 60 may be provided for each hydraulic cartridge 14 attached to the frame 12.

In certain embodiments, fasteners 64 such as bolts 64 may sit substantially flush with respect to the surface of the body 62 and may be tightened and/or loosened by way of an Allen, hex, torx, or other suitable head. To receive the fasteners 64, internally threaded holes may be milled in the frame 12. Although various shapes may be suitable, this embodiment of the locking mechanism 60 is provided in a triangular shape due to the strength of a triangle. In certain embodiments, for aesthetic or structural reasons, the corners of the body 62 may be rounded or chamfered.

A pin 66 may extend from the body 62 to engage an aperture milled in the hydraulic cartridge 14, as will be described hereafter, and thereby prevent rotation of the hydraulic cartridge 14 relative to the frame 12. In certain embodiments, the pin 66 may have a rounded contour which may mate with an aperture in the hydraulic cartridge 14 having substantially the same size and contour. The rounded contour of the pin 66 may minimize scratching or damage to the hydraulic cartridge 14 and aid in centering the pin 66 in the aperture.

In certain embodiments, the pin 66 may include external threads to engage internal threads of a registration member 68. As will be explained in more detail hereafter, the registration member 68 enables adjustment of the pin 66 in a lateral direction 74 with respect to the body 62 in order to slightly rotate the hydraulic cartridge 14 relative to the frame 12. Nevertheless, in other embodiments, the pin 66 may be threaded directly into the body 62. This may provide a simpler design but may lack the ability to adjust the pin 66 in a lateral direction 74 with respect to the body 62.

To extend the pin 66 and thereby engage an aperture in the hydraulic cartridge 14, the pin may include a head 70 which may be turned with a wrench, socket, or other tool. In certain embodiments, the pin 66 may be covered with a cap 72 constructed of a material softer than the hydraulic cartridge 14, such as bronze, brass, aluminum, or the like, to prevent scratching or damage to the hydraulic cartridge 14. The cap 72 may be attached to the pin 66 with a screw 73 or other fastener 73, or may be welded, glued, or otherwise adhered to the surface of the pin 66.

As mentioned, a registration member 68 may be used to adjust the position of the pin 66 in a lateral direction 74 relative to the body 62. This may allow the hydraulic cartridge 14 to be precisely rotated relative to the frame 12 to ensure that the external threads of the hydraulic cartridge 14 properly seat against the internal threads of the frame 12. This may also eliminate most if not all of the play between the tapered threads. In certain embodiments, the registration member 68 may be provided with a substantially flat surface 76 to slide in a lateral direction 74 along a corresponding flat surface 78 provided in the body 62. In certain embodiments, the registration member 68 may be urged and maintained against the flat surface 78 of the body 62, at least in part, by the opposing force exerted by the pin 66 when it engages the hydraulic cartridge 14.

To accommodate and guide the registration member 68, an aperture 80 may be milled in the body 62. The aperture 80 may comprise a narrow portion 82 to accommodate the pin 66 and a wider portion 84 to accommodate the registration member 68. In certain embodiments, the threads 85 of the pin 66 may be flattened such that upon contacting the narrow portion 82 of the aperture 80, they will not mar, scratch, or otherwise damage the threads 85 or the aperture 80.

Figure 8:
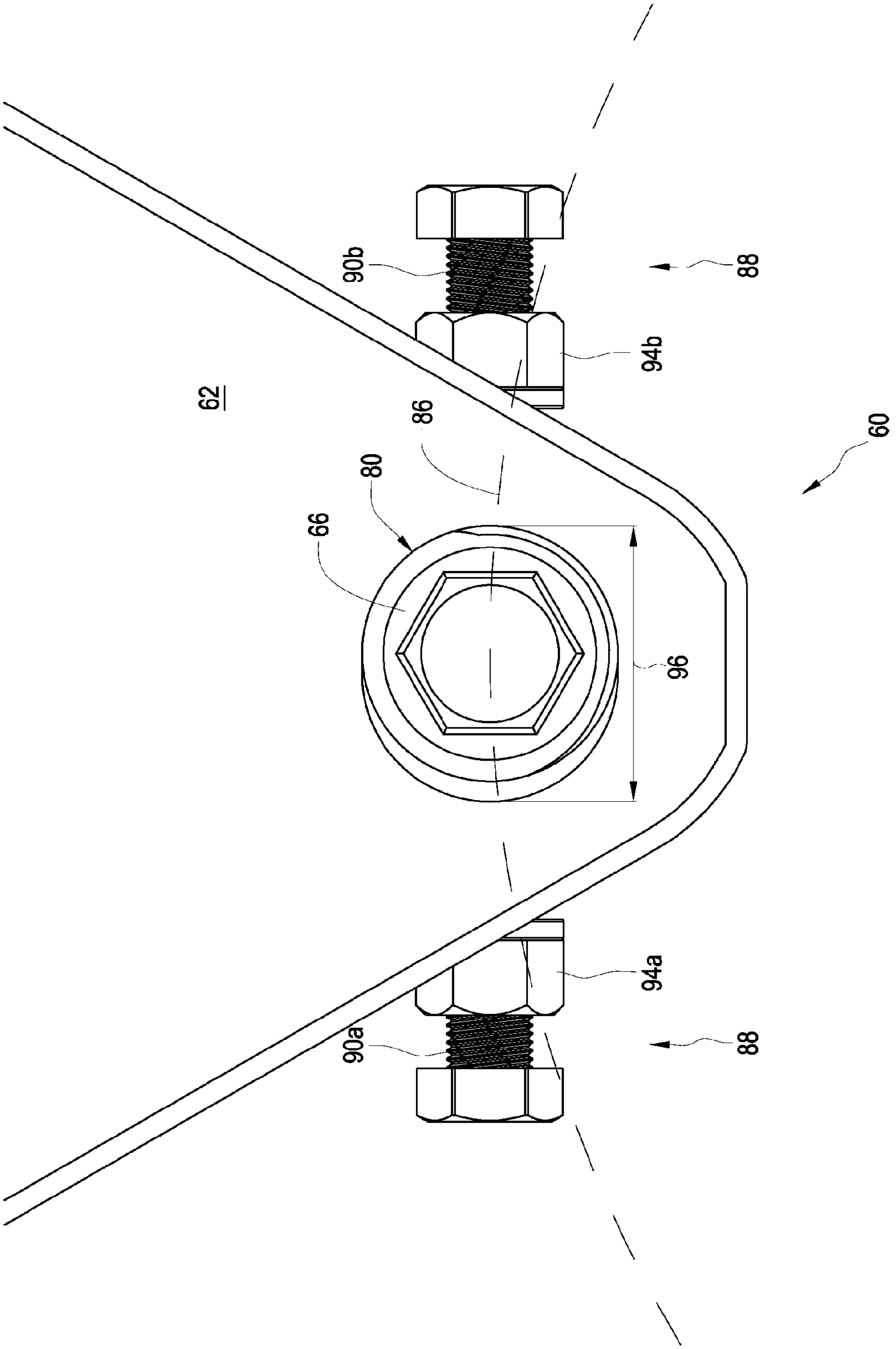
FIG. 8 is an enlarged top view of a pin and its interaction with an aperture formed in the locking mechanism body.

Referring to FIG. 8, while continuing to refer generally to FIGS. 5 through 7, in certain embodiments, both the pin 66 and the registration member 68 are substantially cylindrical. To allow lateral movement 74 of the pin 66 with respect to the body 62, the aperture 80 may have a substantially "kidney bean" shape with a curvature 86 substantially conforming to the curvature of the hydraulic cylinder 32. In the illustration of FIG. 8, the length 96 of the aperture 80 is slightly exaggerated, as compared to FIGS. 5 through 7, to more clearly illustrate the lateral movement 74 of the pin 66 and registration member 68 relative to the body 62. The curvature 86 of the aperture 80 allows the pin 66 and registration member 68 to move along the curved path 86 while preventing or limiting movement perpendicular to the curved path 86 while also allowing movement along the curved path 86 to align the working end 26 with the payload and adjacent anvils.

In certain embodiments, the pin 66 and registration member 68 may be moved laterally 74 along the curved path 86 using an adjustment mechanism 88. For example, the adjustment mechanism 88 may, in certain embodiments, include a pair of bolts, screws, or the like, threaded into the body 62 of the locking mechanism 60. In such an embodiment, a first bolt **90*a* may be used to push the registration member 68 in a first direction along the curved path 86, while a second bolt 90*b*** may be used to push the registration member 68 in the opposite direction along the curved path 86. The bolts 90*a,* 90*b* may, in certain embodiments, push against flat surfaces 92 on the registration member 68.

The adjustment mechanism 88 may be used to finely adjust the position of the pin 66 and thereby rotate the hydraulic cartridge 14 relative to the frame 12. This may enable the tapered threads of the hydraulic cartridge 14 to firmly seat against the tapered threads of the frame 12, thereby eliminating most if not all movement between the hydraulic cartridge 14 and the frame 12. Meanwhile, the pin 66 may also prevent the hydraulic cartridge 14 from unscrewing from the frame 12. Once the pin 66 is adjusted to a desired position, both of the bolts 90*a,* 90*b* may be tightened against the registration member 68 to lock it in place. In certain embodiments, a pair of lock nuts 94*a,* 94*b* may be tightened against the body 62 to prevent loosening of the bolts 90*a,* 90*b.*

Similarly, to re-adjust the position of the pin 66, the lock nuts 94*a,* 94*b* may be loosened and one of the bolts 90*a,* 90*b* may be rotated out of the body 62 to allow movement of the registration member 68 in one direction. The other bolt 90*a,* 90*b* may then be rotated into the body 62 to push the pin 66 and registration member 68 to a desired position. Both bolts 90*a,* 90*b* may then be rotated into the body to lock the pin 66 and registration member 68 in place, as previously described, and the lock nuts 94*a,* 94*b* may then be tightened against the body 62.

Figure 9:
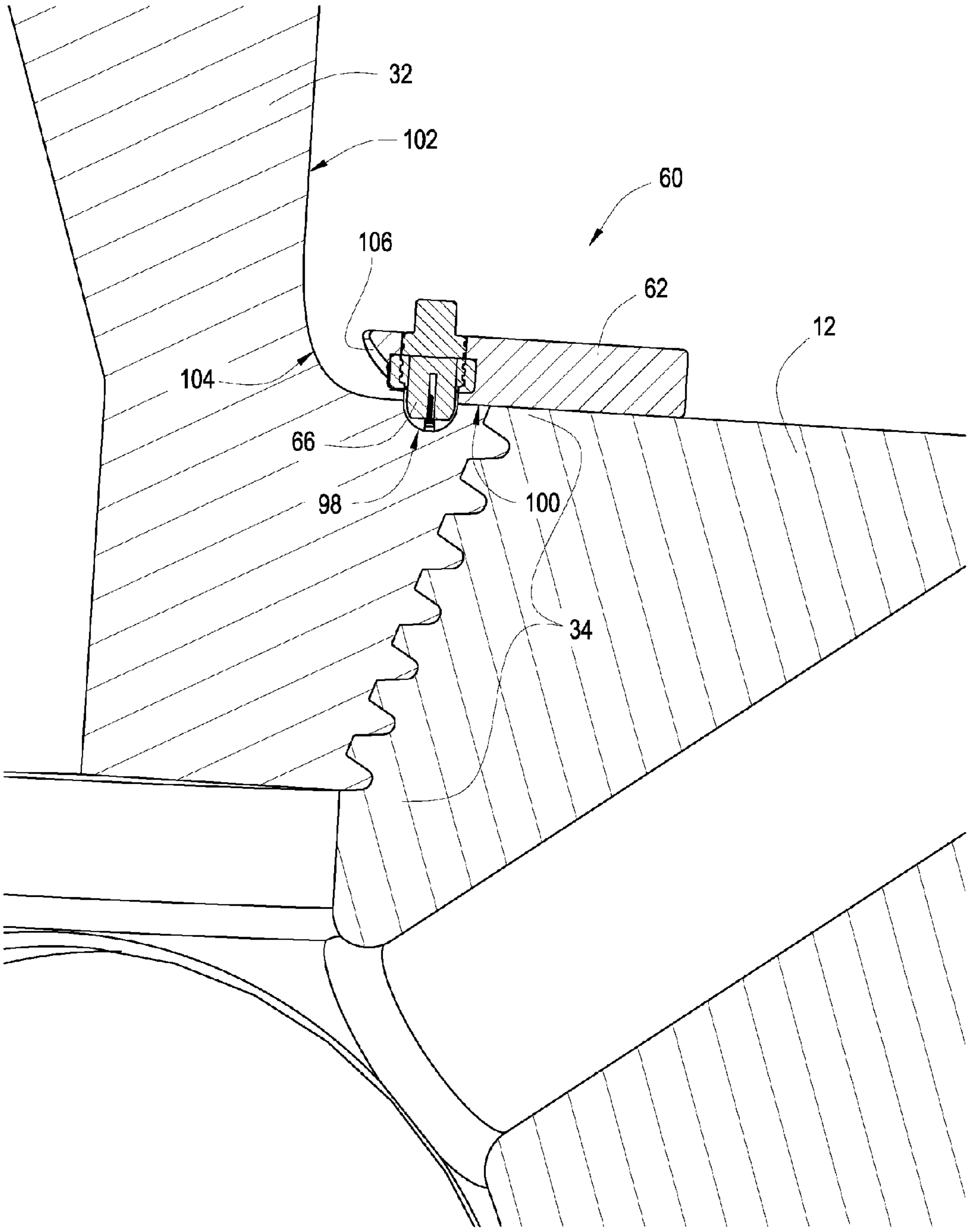
FIG. 9 is a cross-sectional side view of a locking mechanism in accordance with the invention installed and engaged on an HPHT press.

Referring to FIG. 9, in operation, the pin 66 of the locking mechanism 60 may extend into an aperture 98 formed in the hydraulic cylinder 32. In certain embodiments, the pin 66 and aperture 98 are machined such that a very close tolerance exists between the two. This prevents most if not all movement of the hydraulic cylinder 32 relative to the frame 12. In certain embodiments, the inside contour of the aperture 98 is machined to have exactly or substantially the same shape as the pin 66. Thus, the pin 66 may fit snugly into the aperture 98 with very little play or movement therebetween.

As illustrated, the tapered configuration of the threads 34 on the hydraulic cylinder 32 may create a circular flange 100 around the hydraulic cylinder 32. The aperture 98 may be milled or otherwise formed in this flange 100. In certain embodiments, a radius cut 104 may extend from the flange 100 to the cylindrical portion 102 of the hydraulic cylinder 32. The radius cut 104 may add strength to the hydraulic cylinder 32 and more effectively diffuse stresses in the hydraulic cylinder 32. This may prevent or reduce the chances of cracking or fatiguing. In certain embodiments, the body 62 of the locking mechanism 60 may be provided with a radius cut 106, taper 106, curve 106, or the like, to conform to or prevent interference with the radius cut 104 of the hydraulic cylinder 32.

The present invention may be embodied in other specific forms without departing from its essence or essential characteristics. The described embodiments are to be considered in all respects only as illustrative, and not restrictive. The scope of the invention is, therefore, indicated by the appended claims, rather than by the foregoing description. All changes within the meaning and range of equivalency of the claims are to be embraced within their scope.

What is claimed is:

1. A locking mechanism to prevent rotation between a frame and a hydraulic cartridge threaded into the frame, the locking mechanism comprising:

a body;

at least one fastener to attach the body to the frame; and a pin extendable with respect to the body and adapted to engage an aperture in the hydraulic cartridge, the pin preventing rotation of the hydraulic cartridge relative to the frame;

the body further comprises an aperture to accommodate the pin and a registration member to retain the pin, the registration member residing in the aperture;

wherein the aperture is sized to allow lateral movement of the registration member in a lateral direction with respect to an axis of the pin.

2. The locking mechanism of claim 1, wherein the lateral movement occurs along a substantially curved path.

3. The locking mechanism of claim 1, further comprising an adjustment mechanism to adjust the registration member in the lateral direction with respect to the body.

4. The locking mechanism of claim 1, wherein the registration member comprises internal threads engaging external threads on the pin.

5. The locking mechanism of claim 1, wherein the pin is extended with respect to the body by rotating the pin relative to the registration member.

6. The locking mechanism of claim 1, wherein the pin comprises a cap attached thereto to physically contact the hydraulic cartridge, the cap being constructed of a softer material than the hydraulic cartridge to prevent scratching thereof.

* * * * *